United States Patent [19]

Feldman

[11] 3,734,052

[45] May 22, 1973

[54] CASSETTE WITH INDEX MECHANISM FOR MAGNETIC TAPE DICTATING MACHINE

[75] Inventor: Edward Feldman, Teaneck, N.J.

[73] Assignee: McGraw-Edison Company, Elgin, Ill.

[22] Filed: May 31, 1972

[21] Appl. No.: 258,311

[52] U.S. Cl. .................... 116/114, 116/135, 274/4 C, 352/172, 242/199

[51] Int. Cl. .................... G01d 21/00

[58] Field of Search .................... 116/114, 114 J, 124, 116/135; 274/4 C, 4 D, 11 C; 352/170, 172; 242/199, 200

[56] References Cited

UNITED STATES PATENTS 3,410,497 11/1968 Lopez-Henriquez .................274/4 C 3,625,455 12/1971 Streets ................................274/11 C 3,630,170 12/1971 Christo ..............................116/114 R

*Primary Examiner*—Louis J. Capozi

*Attorney*—George H. Fritzinger

[57] ABSTRACT

A cassette for a magnetic tape dictating machine is provided with an index mechanism as a part thereof. The index mechanism comprises an index member bearing indicia and mounted concentric with the drive-spindle opening for one of the reels, preferably the supply reel, and a cooperating index pointer. Through a planocentric reducer coupled to the supply reel hub a movement of approximately one revolution is obtained between the index member and pointer responsive to a transfer of a full length of tape from one reel to the other.

7 Claims, 4 Drawing Figures

CASSETTE WITH INDEX MECHANISM FOR MAGNETIC TAPE DICTATING MACHINE

An object of the invention is to provide a cassette for a tape - record dictating machine, which does not require an index member separate from the cassette.

Another object is to provide a cassette adapted especially for a tape record dictating machine, which has an index mechanism mounted thereon and transported therewith as a part thereof.

Another object is to provide a form of such index mechanism for a cassette, which is of a thin compact construction.

Another object is to provide such an index mechanism for a cassette, which is of a very simple and economical construction.

These and other objects and features of the invention will be apparent from the following description and the appended claims.

In the description of my invention, reference is had to the accompanying drawings, of which:

The cassette shown in the accompanying figures comprises a thin oblong case 10 of two sections 11 and 12 of molded plastic material having rim flanges 13 and 14 at the front and back sides and rim flanges 15 at the ends. The two sections 11 and 12 are seated against one another edge-to-edge so that the rim flanges form the side walls and provide a suitable spacing between the top and bottom walls. The sections are secured together in permanent relationship as by heat sealing or by suitable adhesive cement.

Figures 1, 2:
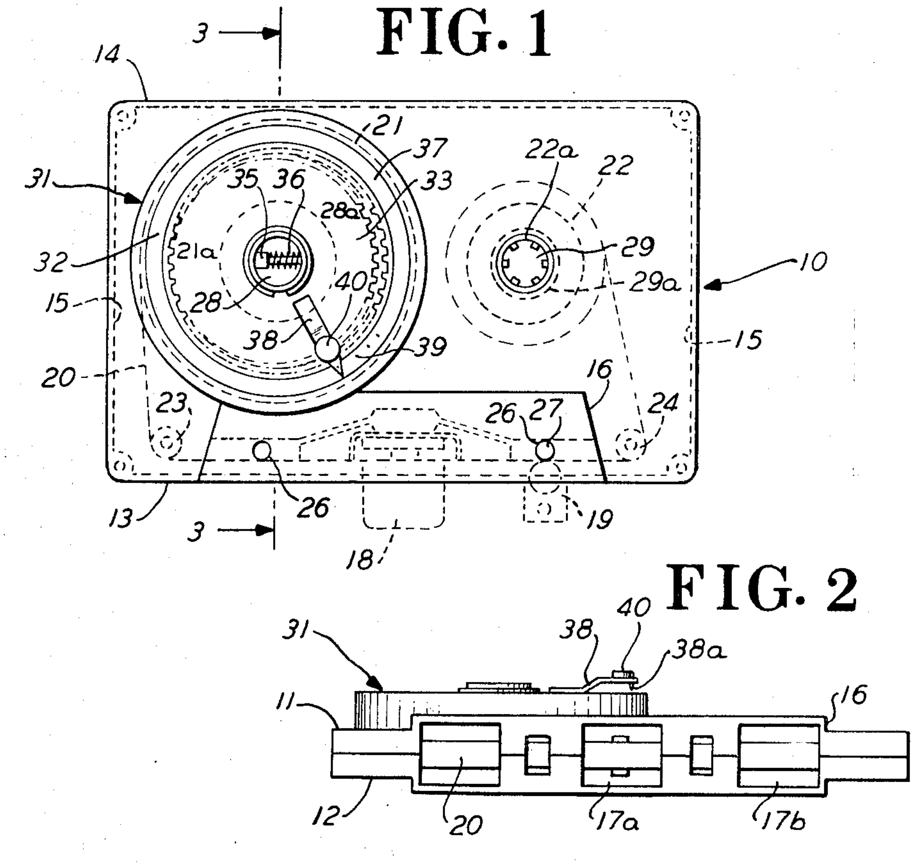
FIG. 1 is a plan view of a cassette for a tape-record dictating machine showing an index mechanism according to my invention mounted thereon and as a part thereof.
FIG. 2 is a front-end elevational view of the cassette shown in FIG. 1.
Figure 3:
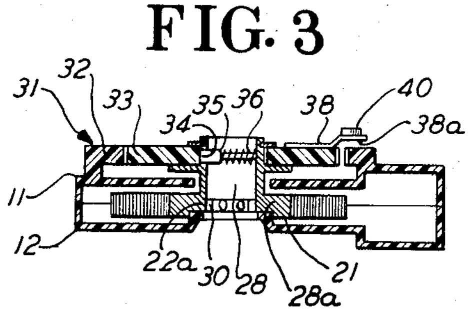
FIG. 3 is a cross section on the line 3—3 of FIG. 1.

The top and bottom wall portions leading to the front side wall are offset outwardly at 16 to provide a greater spacing therebetween and in the front side wall are openings 17*a* and 17*b* to receive a tape recorder-reproducer head 18 and a pressure roller 19 both dottedly shown in FIG. 1. A tape 20 is led between supply and takeup reels 21 and 22 around guide rollers 23 and 24 at the front corners of the cassette. When the cassette is mounted in the machine a head 18 and pressure roller 19 engage a run of the tape between the two guide rollers. A spring mounted pad holds the tape with pressure against the head 18. A pair of openings 26 in the top and bottom sections provide clearance for a capstan 27 which engages the tape in a driving relationship under pressure from the roller 19. Further, there are symetrically located through-openings 28 and 29 having inwardly extending flanged rims 28*a* and 29*a* on which are journaled the reels 21 and 22 for the tape. These reels have hub portions 21*a* and 22*a* provided with radially inwardly extending spokes 30 for engaging respective spindles (not shown) of the tape record machine.

The present invention resides in an index mechanism 31 provided as part of the cassette and operated from one of the reels, preferably the supply reel 21, through a planocentric reducer. This index mechanism includes an outer annular internaltooth gear 32 preferably of plastic material molded integrally with the top section 11 in concentric relation to the spindle opening 28 for the supply reel 21. Resting on the outer face of the top section 11, within the annular gear 32, is an inner external tooth gear 33. This inner gear has a predetermined lesser number of teeth than the outer annular gear 31 and is sufficiently smaller in diameter to permit it to move eccentrically in rotating engagement with the annular gear. The inner gear 33 has a center hole 34 receiving an outer portion of the hub 21a with a sufficient clearance to permit the inner gear to move eccentrically in rotating engagement with the outer gear as just explained. Slidably traversing this outer hub portion 21*a* in diametrical relation thereto is a headed pin 35 biased radially by a compression spring 36 into sliding engagement with the inner edge of the center hole 34 of the inner gear. By means of this spring-biased pin or plunger the inner gear is maintained in meshing engagement with the outer gear at a pont in line with the pin. Thus, as the tape is unreeled from the supply roll to the take-up reel the point of engagement of the inner gear with the outer gear is rotated in accordance with the rotation of the supply reel. Since the inner gear has a lesser number of teeth than the outer gear it is rotated about its axis by a percentage revolution for each revolution of the supply reel equal to the ratio of the difference in the number of teeth between the two gears divided by the number of teeth on the inner gear. By way of example, the outer gear may have 201 teeth and the inner gear 200 teeth to produce a 1/200th revolution of the inner gear for each revolution of the supply reel.

Figure 4:
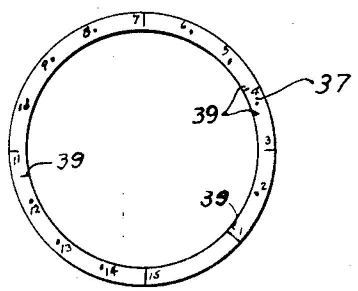
FIG. 4 is a view of the annular index slip used with the present cassette.

The indexing apparatus includes an index member 37 bearing indicia and a marking pointer 38. By way of example the index member 37 may be of annular shape mounted stationarily on the outer annular gear 32, as shown, and the pointer 38 is then mounted on the inner gear 33 for rotary movement along the border of the index member. However, alternatively, this arrangement may be reversed with a disk-shaped index member mounted in the movable inner gear 33 and a stationary marking pointer mounted on the cassette over the outer gear 32. The index member may be of any suitable character, for example, one on which a mark 39 can be made when the member is engaged by a stylus. For this reason, the pointer 38 is provided with a stylus 38*a* at its outer end and is flexibly mounted so that it can be pressed into marking engagement with the index member as by pressing on a push button 40 on the outer portion of the pointer. For the illustrative number of teeth on the two gears of 201 and 200 respectively as above-described, the index pointer would be turned through nearly the whole arcuate length of the index member from marks 1 to 15 (FIG. 4) responsive to 200 revolutions of the supply reel. This is the usual number of revolutions of the supply reel incurred in reeling the whole length of the tape from one reel to the other.

Since movement of the index pointer is in direct proportion to the rotation of the supply reel, and the length of the tape unreeled from the supply reel varies in proportion to the varying diameter of the supply roll of tape, the movement of the index pointer is in non-linear relation to the movement of the tape past the record-reproduce head 18. However, this non-linear variation from a full supply roll to an empty roll is typically only in the ratio of about 3 to 2 and is therefore of no serious consequence since this ratio is preserved during transcribing the same as during dictating with the result that the index marks will direct the transcriber to the same points on the tape as where the dictator was recording when the respective marks were made.

The embodiment of my invention herein particularly shown and described is intended to be illustrative and not necessarily limitative of my invention since the same is subject to changes and modifications without departure from the scope of my invention which I endeavor to express according to the following claims.

I claim:

1. A cassette for a tape record dictating machine comprising a thin oblong case having two sets of aligned openings through the top and bottom walls thereof, said openings having inwardly extending flanged rims forming journal bearings, supply and take-up reels in said cassette having hubs loosely journaled on the flanged rims of said respective openings, said hubs having radial spokes between the flanged rims of said openings for coupling engagement with respective drive spindles of the tape record machine when the cassette is mounted thereon, an index mechanism comprising an index member bearing indicia mounted in concentric relation to one of said journal bearings, an index pointer, means mounting said index member and pointer on said cassette for relative rotary movement, and a step-down drive mechanism operated from the hub journalled on said one bearing for producing said relative rotary movement between said index member and index pointer responsive to a reeling of a tape from one of said reels to the other.

2. The cassette set forth in claim 1 wherein said drive mechanism is a planocentric reducer.

3. The cassette set forth in claim 1 wherein said index pointer is flexibly mounted to permit the same to be pressed into marking engagement with said index slip.

4. The cassette set forth in claim 2 wherein said planocentric reducer comprises an annular internal-tooth gear fixedly mounted on one face of said cassette in concentric relation to the opening for said supply reel member, an inner external tooth gear mounted on said face of the cassette loosely within said outer annular gear and having a predetermined lesser number of teeth than said outer annular gear, said inner gear having a center hole loosely receiving an outer hub extension of said supply reel, and spring means on said outer hub extension for radially biasing said inner gear in meshing engagement with said outer gear at a point in fixed relation to said supply reel whereby to provide a rotating engagement of the inner gear with said outer gear as said supply reel is rotated.

5. The cassette set forth in claim 4 wherein said annular outer gear is a plastic member molded integrally with the case of said cassette.

6. The cassette set forth in claim 4 wherein said spring-loaded means comprises a plunger extending slidably in diametrical relation through said hub, and a compression spring on said plunger for pressing the same at one end in slidable engagement with the inside edge of the hub of said inner gear to maintain the inner gear meshing engagement with said outer gear at a point in line with said plunger.

7. A cassette for a tape record dictating machine comprising a thin oblong case having two sets of aligned openings through the top and bottom walls thereof, said openings having inwardly extending flanged rims forming journal bearings, supply and take-up reels in said cassette having hubs loosely journaled on the flanged rims of said respective openings, said hubs having radial spokes between the flanged rims of said openings for coupling engagement with respective drive spindles of the tape record machine when the cassette is mounted thereon, an annular index member mounted on one face of said cassette in concentric relation to the opening for one of said reels, an index pointer rotatably mounted within said annular index member for arcuate indexing movement along the index member, and a planocentric reducer comprising an annular internal-tooth gear fixedly mounted on one face of said cassette in concentric relation to the opening for said supply reel with said annular index member mounted on the face of said annular gear, an inner external tooth gear mounted on said face of the cassette loosely within said outer annular gear and having a predetermined lesser number of teeth than said outer annular gear, said inner gear having a center hold loosely receiving an outer hub extension of said supply reel, and spring means on said outer hub extension for radially biasing said inner gear in meshing engagement with said outer gear at a point in fixed relation to said supply reel whereby to provide a rotating engagement of the inner gear with said outer gear as said supply reel is rotated, and means mounting said index pointer on said inner gear.

* * * * *